(12) United States Patent
Motomura et al.

(10) Patent No.: US 10,479,174 B2
(45) Date of Patent: Nov. 19, 2019

(54) OPENING AND CLOSING MECHANISM AND SUNROOF DEVICE HAVING THE SAME

(71) Applicant: AISIN(NANTONG) TECHNICAL CENTER OF CHINA CO., LTD, Netda (CN)

(72) Inventors: Syota Motomura, Netda (CN); Yang Zhong, Netda (CN)

(73) Assignee: AISIN(NANTONG) TECHNICAL CENTER OF CHINA CO., LTD, Netda (CN)

( * ) Notice: Subject to any disclaimer, the term of this patent is extended or adjusted under 35 U.S.C. 154(b) by 0 days.

(21) Appl. No.: 15/904,638

(22) Filed: Feb. 26, 2018

(65) Prior Publication Data

US 2019/0061494 A1    Feb. 28, 2019

(30) Foreign Application Priority Data

Aug. 29, 2017    (CN) .................... 2017 2 1089893 U

(51) Int. Cl.
*B60J 7/05*       (2006.01)
*B60J 7/053*      (2006.01)
*B60J 7/057*      (2006.01)
*B60J 7/02*       (2006.01)

(52) U.S. Cl.
CPC ............. *B60J 7/05* (2013.01); *B60J 7/024* (2013.01); *B60J 7/053* (2013.01); *B60J 7/057* (2013.01); *B60J 7/0573* (2013.01)

(58) Field of Classification Search
CPC ... B60J 7/024; B60J 7/043; B60J 7/047; B60J 7/057; B60J 7/0573; B60J 7/05; B60J 7/053

USPC .... 296/216.02–216.05, 216.06–216.09, 221, 296/222, 223, 220.01
See application file for complete search history.

(56) References Cited

U.S. PATENT DOCUMENTS

| | | | |
|---|---|---|---|
| 7,914,073 B2 * | 3/2011 | Hotta ..................... | B60J 7/05 296/216.08 |
| 8,534,749 B2 * | 9/2013 | Nishiyama .............. | B60J 7/024 296/221 |
| 2015/0091334 A1 | 4/2015 | Ohdoi et al. | |

FOREIGN PATENT DOCUMENTS

| | | |
|---|---|---|
| CN | 203267743 U | 11/2013 |
| JP | 2013-216235 | 10/2013 |

* cited by examiner

*Primary Examiner* — Dennis H Pedder
(74) *Attorney, Agent, or Firm* — Oblon, McClelland, Maier & Neustadt, L.L.P.

(57) ABSTRACT

An opening and closing mechanism includes a connecting member and a sliding member. A movable panel of a sunroof device is fastened to the connecting member which has a plate-type connecting member main body extending in a front-rear direction, and a thickness direction of the connecting member main body coincides with a width direction. The connecting member main body is formed with a through hole which goes through the connecting member main body in the width direction and extends along the specified curve in the front-rear direction. The sliding member has a sliding member main body formed by sheet metal, the sliding member main body includes a pair of vertical walls and a connecting wall which connects upper ends of the vertical walls, and the connecting wall engages with and slides in the through hole so the connecting member inclines in an up-down direction or moves in the front-rear direction.

7 Claims, 6 Drawing Sheets

(a)

(b)

(c)

(d)

(a)

(b)

OPENING AND CLOSING MECHANISM AND SUNROOF DEVICE HAVING THE SAME

CROSS-REFERENCE TO RELATED APPLICATION

The present application is based on and claims priority to Chinese Patent Application No. 201721089893.7, filed on Aug. 29, 2017, and the entire contents of this Chinese Patent Application application are hereby incorporated by reference herein in entirety.

FIELD OF THE INVENTION

The invention relates to an opening and closing mechanism used for a sunroof device of a vehicle and a sunroof device having said opening and closing mechanism.

DESCRIPTION OF RELATED ART

It is previously known a sunroof device which is mounted on an opening part formed in a roof of a vehicle, said sunroof device includes: a frame which is disposed along an opening edge of the opening part and has left and right guide rails; a movable panel which can be mounted on the left and right guide rail in a way of relatively moving; and an opening and closing mechanism which makes the movable panel open and close.

The opening and closing mechanism includes: a connecting member which is mounted with the movable panel; and a sliding member which makes the connecting member incline in the up-down direction of the vehicle or move in the front-rear direction of the vehicle. The connecting member has: a plate-type main body which extends along the front-rear direction of the vehicle; and a cam groove which is formed on both side surfaces of vehicle width direction of the main body. The cam groove is composed of a lower wall which extends along a specified curve, an upper wall which is located above the lower wall and extends generally parallel to the lower wall and a side wall which connects the lower wall and the upper wall; the upper wall and the lower wall protrude outwards from both sides of the main body in the vehicle width direction. The sliding member includes a pair of relative vertical walls, a connecting wall which connects lower ends of said pair of vertical walls, a pair of separate engagement parts which protrude from an upper end of each vertical wall to a direction of relative vertical wall, respectively, a pair of protrusion pieces which protrude from an front end and rear end of each vertical wall to an opposite direction of relative vertical wall, and a slider which is disposed on said pair of protrusion pieces. The sliding member is formed by insert molding of plate metals and resin, wherein, the above vertical wall, connecting wall, engagement parts and protrusion pieces are made of curving plate metals, and the slider is made of resin. The left and right sliders can, respectively, be slidably engaged with guide grooves of the left and right guide rails, and push-pull cable is integrated with an outer part of the slider in the vehicle width direction, the push-pull cable is driven by a motor so as to make the slider move in the guide groove of the guide rail along the front-rear direction of the vehicle. Moreover, the pair of engagement parts of said sliding member can be slidably engaged with the cam groove of the connecting member and the engagement part of the sliding member slides along the specified curve in the cam groove to incline the connecting member in the up-down direction of the vehicle or to move it in the front-rear direction of the vehicle.

Prior Art: Chinese utility model patent CN203267744U

In above previous sunroof device, the upper end of the sliding member is separated and the shape thereof is complicated, which may cause relative error easily; there also may be easy to cause relative error between upper and lower wall of the cam groove on both sides of the connecting member, which may cause space between a pair of engagement parts of the sliding member and two pairs of upper and lower walls of the connecting member and thus generating abnormal noise and being hard to slide. Therefore, it requires high precision about the size of both the slide member and the connecting member to avoid the above problems. Furthermore, it needs to coating lubricating oil on upper and lower walls of both cam grooves on both sides of the connecting member to make the pair of engagement part slide smoothly, which causes relatively high cost on lubricating. In addition, in order to ensure the strength of a pair of engagement parts in the up-down direction of the vehicle, it needs to enlarge the size of a pair of vertical walls in the front-rear direction, thus leading to a heavier weight of the sliding member and a relatively higher material cost. Moreover, because both sides of the connecting members are protruded with upper and lower walls used for forming the cam groove, the overall width size of the connecting member increases, the weight is heavier and the material cost is higher.

SUMMARY OF THE INVENTION

The present invention has been made in view of the above problems, and an object of the present invention is to provide an opening and closing mechanism having a simple structure, a manageable size, a feature of miniaturization and a low cost, and a sunroof device having said opening and closing mechanism.

The opening and closing mechanism of the present invention is used to make a movable panel of the sunroof device move, including: a connecting member and a sliding member; the movable panel is fastened to the connecting member which has a plate-type connecting member main body which extends in the front-rear direction of the vehicle, and the thickness direction of the connecting member main body coincides with the width direction of the vehicle; the connecting member main body is formed with a through hole which goes through the connecting member main body in the width direction of the vehicle and extends along the specified curve in the front-rear direction of the vehicle; the sliding member has a sliding member main body formed by sheet metal, the sliding member main body includes a pair of vertical walls which are opposite each other and a connecting wall which connects upper ends of said pair of vertical walls, and the connecting wall engages with and slides inside the through hole to make the connecting member incline in the up-down direction of the vehicle or move in the front-rear direction of the vehicle.

According to above structure, due to the sliding member main body is formed by a piece of continuous sheet, which means, upper ends of a pair of vertical walls are connected by the connecting wall, the shape is simple that won't cause relative error, and the size management is easy to perform; and the connecting member only has one pair of upper and lower walls, thus, there would be not easy to cause abnormal noise and non-smooth slide between the connecting wall and the through hole. Furthermore, because the sliding member is engaged with the through hole by the connecting wall, it is only necessary to coat lubricating oil on the upside and downside walls of the through hole having relatively narrow width, thereby saving usage amount of the lubricating oil and coating time. In addition, since the upper ends of a pair of vertical wall are connected together by the connecting wall, it can ensure the strength of the sliding member even though the width in the vehicle front-rear direction of the vertical wall is relatively narrow. What's more, because the through hole is formed on the main body of the connecting member, instead of the upper and lower walls which protrude from both sides of the main body of the connecting member outwardly to the width direction of the vehicle to form, the cam groove, it can reduce the size of the connecting member in the direction of the width of the vehicle, so that the opening and closing mechanism is integrally miniaturized and lightweight, which reduces the cost.

Furthermore, advantageously, the sliding member further includes a slider which is separated from the main body of the sliding member, and the sliding member main body is supported on the guide rail of the sunroof device by the slider in a free sliding way.

Moreover, advantageously, the sliding member main body further includes a pair of projections, the projection of one side of said pair of projections protrudes from the lower end of the vertical wall of one side of said pair of vertical walls in the direction opposite to the vertical wall of the other side of said pair of vertical walls, the projection of the other side of said pair of projections protrudes from the lower end of the vertical wall of the other side in the direction opposite to the vertical wall of the one side, and said pair of projections are engaged with the slider in order to fasten the main body of the sliding member to the slider.

According to above structure, the sliding member main body and the slider are formed separately, which makes it easy to machine and contributes to lower the cost comparing to the previous integrated structure obtained by insert molding above two. Moreover, when one of the sliding member main body and the slider is broken, it doesn't necessary to abandon the whole sliding member, but just replacing the broken sliding member main body or the slider.

Furthermore, advantageously, the cross section of the connecting wall along the front-rear direction of the vehicle shows S shape, so that, during the whole process that the connecting wall slides in the through hole, the connecting wall contacts with the upside wall and downside wall of the through hole on two parts of the upper surface and lower surface of the connecting wall the whole time, respectively.

According to above structure, because the connecting wall is made into a structure that: during the whole sliding process, the connecting wall can contacts with the upside wall and downside wall of the through hole on two parts of its upper surface and lower surface the whole time, it can efficiently prevent the connecting wall from waggling in the through hole and suppress abnormal noise.

The present invention further relates to a sunroof device, including: a movable panel which make the opening part disposed in the roof of the vehicle open and close; a pair of above-mentioned opening and closing mechanisms which are disposed under the movable panel along edge part on both sides of the movable panel in the width direction of the vehicle, respectively; and a pair of guide rails which are disposed on opening edge on both sides of the opening part in the width direction of the vehicle, respectively, said pair of opening and closing mechanism is supported on said pair of guide rails in a free sliding way.

Figure 1:
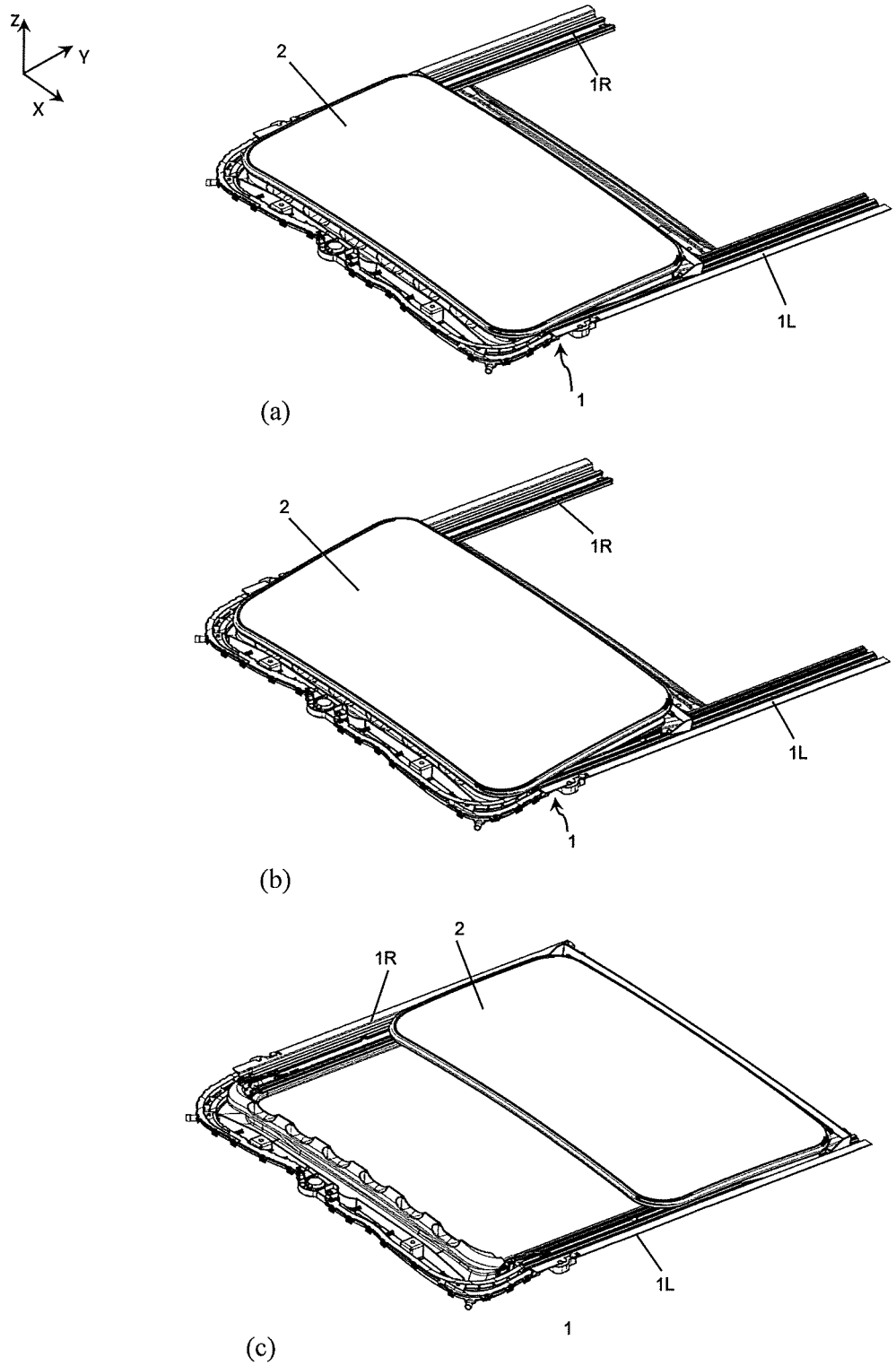
FIG. 1 is a perspective view showing a sunroof device of the present invention, wherein, (a) indicates a fully-closed state of the sunroof device, (b) indicates an inclined state of the sunroof device, and (c) indicates a fully-opened state of the sunroof device.

REFERENCE SIGNS 1L, 1R left and right guide rails
11 guide groove
111 blocking piece
1a first engagement hole
1b second engagement hole
2 movable panel
3 opening and closing mechanism
4 connecting member
41 connecting member main body
42 through hole
42a upside wall
42b downside wall
42c fully-closed area
42d inclined area
42f fully-opened area
43 front slider
44 front pin
45 rear pin
5 sliding member
51 sliding member main body
511, 511' vertical walls
512 connecting wall
513, 513' projections
5121 first rounded corner
5122 first plane
5123 second rounded corner
5125 third rounded corner 5126 second plane
5127 forth rounded corner
52 slider
6 car roof
7, 8 motors
71, 81 connectors
72, 82 push-pull cables Embodiments of the Invention Preferred embodiments of the present invention will be described with reference to the accompanying drawings.

Figure 2:
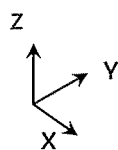
FIG. 2 is a perspective view showing an opening and closing mechanism of the sunroof device of the present invention.
Figure 2:
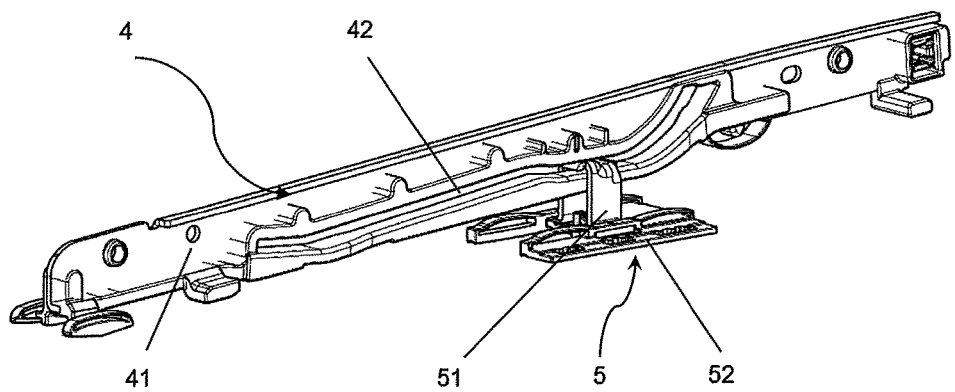

FIG. 1 is a perspective view showing a sunroof device of the present invention, wherein, (a) indicates a fully-closed state of the sunroof device, (b) indicates an inclined state of the sunroof device, and (c) indicates a fully-opened state of the sunroof device. FIG. 2 is a perspective view showing the opening and closing mechanism of the sunroof device of the present invention. And in the drawings, a width direction of the vehicle is set as X direction, and a front-rear direction of the vehicle is set as Y direction, and an up-down direction of the vehicle is set as Z direction.

The sunroof device of the present invention is mounted on an opening part formed in a car roof. As shown in FIGS. 1 and 2, the sunroof device includes: a frame 1 which is disposed along an opening edge of the opening part of the car roof and has left and right guide rails 1L and 1R; a movable panel 2 which makes the opening part of the car roof open and close; and a pair of opening and closing mechanisms 3 which drive the movable panel 2 switching among the fully-closed location shown in FIG. 1(a), the inclined location shown in FIG. 1(b) and the fully-opened location shown in FIG. 1(c) (FIG. 4 only shows the opening and closing mechanism on one side). The pair of opening and closing mechanisms 3 are mounted under the movable panel 2 along edge part on both sides of the movable panel 2 in the width direction of the vehicle, respectively. The left and right guide rails 1L and 1R are disposed on opening edge on both sides of the opening part of the car roof in the width direction of the vehicle respectively, and the pair of opening and closing mechanisms 3 is supported on the left and right guide rails 1L and 1R in a free sliding way, respectively.

Detailed structure of the opening and closing mechanism 3 will be described.

As shown in FIG. 2, the opening and closing mechanism 3 includes a connecting member 4 and a sliding member 5.

The above movable panel 2 is fastened to the connecting member 4 which has a plate-type connecting member main body 41. The connecting member main body 41 extends in the front-rear direction of the vehicle, and the thickness direction of the connecting member main body 41 coincides with the width direction of the vehicle. The connecting member main body 41 is formed with a through hole 42 which goes through the connecting member main body 41 in the width direction of the vehicle and extends along the specified curve in the front-rear direction of the vehicle.

Figure 3:
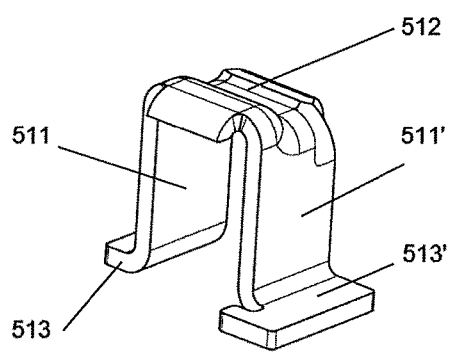
FIG. 3 is a perspective view of a main body of a sliding member of the present invention.

FIG. 3 is a perspective view of the sliding member main body of the present invention.

As shown in FIGS. 2 and 3, the sliding member 5 has a sliding member main body 51 which is formed by sheet metal through stamping and a resin-made slider 52 which is separated from the sliding member main body 51. The sliding member main body 51 includes a pair of vertical walls 511 and 511' which are opposite each other, and a connecting wall 512 which connects upper ends of said pair of vertical walls 511 and 511'. The connecting wall 512 is engaged with the through hole 42 of the connecting member 4 and slides in the through hole 42, so as to make the connecting member 4 incline in the up-down direction of the vehicle or move in the front-rear direction of the vehicle.

Furthermore, the sliding member main body 51 also includes a pair of projections 513 and 513'. The projection 513 of one side of said pair of projections protrudes from the lower end of the vertical wall 511 of one side of said pair of vertical walls in the direction opposite to the vertical wall 511' of the other side of said pair of vertical walls, and the projection 513' of the other side of said pair of projections protrudes from the lower end of the vertical wall 511' of the other side in the direction opposite to the vertical wall 511 of the one side. Said pair of projections 513 and 513' are engaged with the slider 52 in order to fasten the sliding member main body 51 to the slider 52. Moreover, as shown in the following FIG. 4, the sliders 52 on the left and right side are engaged with guide grooves 11 on the left and right guide rail 1L and 1R, respectively, so that the sliding member main body 51 on the left and right side is supported on the left and right guide rail 1L and 1R in a free sliding way. In addition, one end of a push-pull cable 72 (see FIG. 7) is fixed on the outside part of the slider 52 in the vehicle width direction. The push-pull cable 72 is driven by a motor 7 (see FIG. 7) to slide the slider 52 in the guide groove 11 along the front-rear direction of the vehicle.

Next, motion of the movable panel 2 driven by the opening and closing mechanism 3 will be described.

Figure 4:
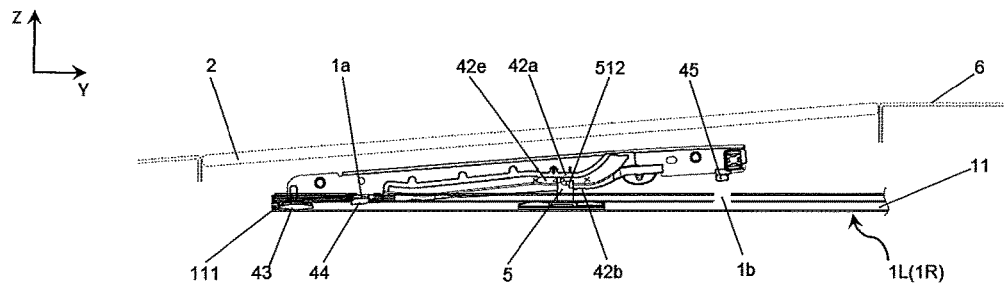
FIG. 4 is a cross-sectional view of a guide rail and the opening and closing mechanism of the present invention taken along the front-rear direction of the vehicle, wherein, (a) indicates a fully-closed state of the sunroof device, (b) indicates an inclined state of the sunroof device, (c) indicates a lowered state of the sunroof device, and (d) indicates a fully-opened state of the sunroof device.
Figure 4:
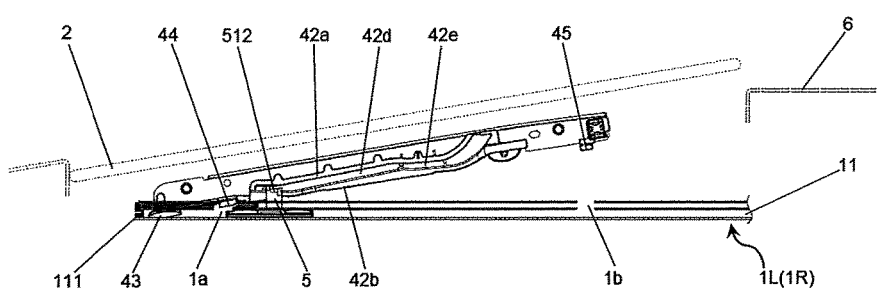
Figure 4:
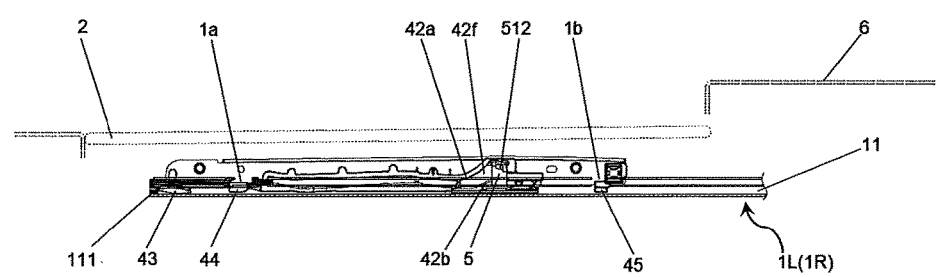
Figure 4:
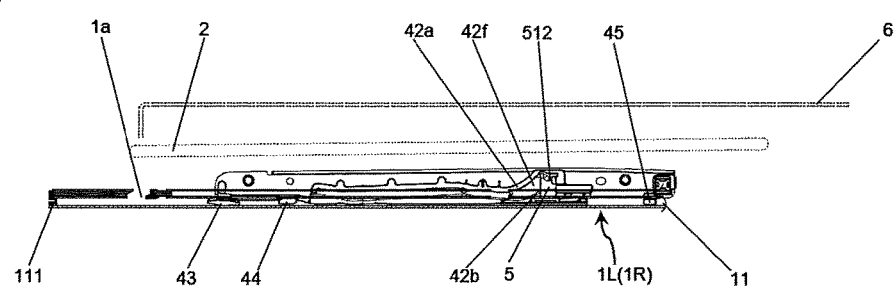

FIG. 4 is a cross-sectional view of the guide rail and the opening and closing mechanism of the present invention taken along the front-rear direction of the vehicle, wherein, (a) indicates a fully-closed state of the sunroof device, (b) indicates an inclined state of the sunroof device, (c) indicates a lowered state of the sunroof device, and (d) indicates a fully-opened state of the sunroof device.

As shown in FIG. 4(a), in the fully-closed state, the connecting wall 512 of the sliding member 5 is located in the fully-closed area 42e of the through hole 42. At this point, a front slider 43 disposed on the front end of the connecting member 4 contacts with the blocking piece 111 disposed on the guide groove 11, in order to prevent the connecting member 4 from moving further forward. The front pin 44 disposed on the front of the connecting member 4 enters a first engagement hole 1a of the guide rail 1L (1R), which prevent the connecting member 4 from moving backward. On the other hand, the rear pin 45 disposed on the rear of the connecting member 4 is located above a second engagement hole 1b of the guide groove 11 and kept outside thereof completely. In the fully-closed state, the movable panel 2 is basically flushed with the car roof 6.

Figure 7:
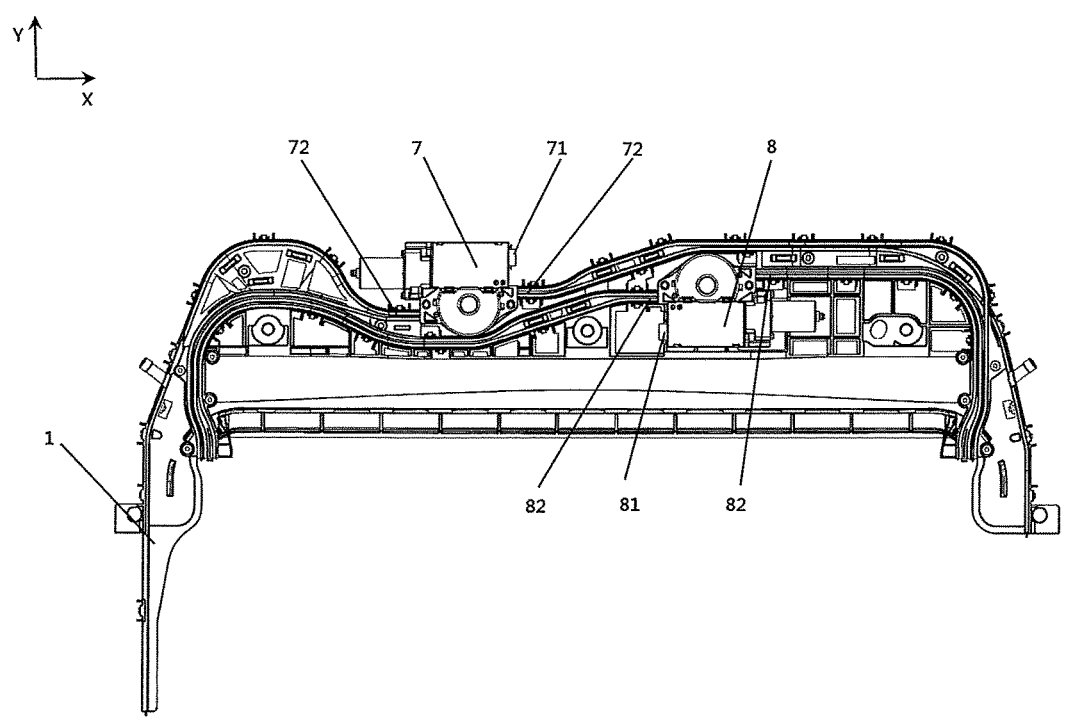
FIG. 7 is a top view showing motors of the present invention used for driving the movable panel and a sun shade, respectively.

As shown in FIG. 4(b), when the movable panel 2 is switched from the fully-closed position to the inclined position, the sliding member 5 is moved forward via the push-pull cable 72 (see FIG. 7) by the motor 7 (see FIG. 7). Therefore, the connecting wall 512 of the sliding member 5 moves forward in the inclined area 42d of the through hole 42. At this point, because the inclined area 42d is inclined downward toward the front, the connecting wall 512 pushes the upside wall 42a of the through hole 42 forward. However, because the forward motion of the connecting member 4 is restricted by the blocking piece 111 and the backward motion is restricted by the engagement between the front pin 44 and the first engagement hole 1a, the connecting member 4 does not move back and forth. On the other hand, because the front pin 44 is located in the first engagement hole 1a and the rear pin 45 is located above and kept outside the second engagement hole 1b, the inclined motion of the connecting member 4 in the up-down direction is not restricted. Thus, the rear end of the connecting member 4 is raised using the front slider 43 as a fulcrum. Therefore, the movable panel 2 inclines in a way of rising in the rear end. As shown in FIG. 4(b), when the connecting wall 512 reaches foremost end of the inclined area 42d, the inclined angle of the moveable panel 2 is at a maximum. At this point, the front pin 44 is not completely located outside of the first engagement hole 1a.

When the movable panel 2 is switched from the inclined position to the fully-closed position, the sliding member 5 is moved backward via the push-pull cable 72 (see FIG. 7) by the motor 7 (see FIG. 7). Thus, the connecting wall 512 of the sliding member 5 moves backward in the inclined area 42d of the through hole 42. At this point, because the inclined area 42d is inclined downward toward the front, the connecting wall 512 pushes the downside wall 42b of the through hole 42 backward. However, because the forward motion of the connecting member 4 is restricted by the blocking piece 111 and the backward motion is restricted by the engagement between the front pin 44 and the first engagement hole 1a, the connecting member 4 does not move back and forth. On the other hand, because the front pin 44 is located in the first engagement hole 1a and the rear pin 45 is located above and kept outside the second engagement hole 1b, the inclined motion of the connecting member 4 in the up-down direction is not restricted. Thus, the rear end of the connecting member 4 lowers using the front slider 43 as a fulcrum. Therefore, the rear end of the movable panel 2 is lowered, too. When the connecting wall 512 reaches the fully-closed area 42e, the movable panel 2 reaches the fully-closed state. At this point, the front pin 44 is not completely located outside of the first engagement hole 1a and is still engaged with the first engagement hole 1a. The rear pin 45 is still located above and kept outside the second engagement hole 1b. Furthermore, as shown in the following FIG. 6(c), the curve extending by the through hole 42 is designed as: during the transition from the above inclined area 42d to the fully-closed area 42e, the movable panel 2 is moderately raised first and then lowered further, thereby the sealing strip mounted between the movable panel 2 and the opening part of the car roof (not shown in the figures) can be loosened to prevent the sealing strip from being squashed.

In order to switch the movable panel 2 from fully-closed position to open position, the movable panel 2 first switches to the lowered position shown in FIG. 4(c), and then the movable panel 2 is moved backward.

In order to switch the movable panel 2 from fully-closed position to lowered position, the driving motor 7 (see FIG. 7) makes the sliding member 5 move backward via the push-pull cable 72 (see FIG. 7). In this way, the connecting wall 512 of the sliding member 5 moves backward in the fully-opened area 42f of the through hole 42. At this point, because the fully-opened area 42f is inclined downward toward the front, the connecting wall 512 pushes the downside wall 42b of the through hole 42 backward. However, because the forward motion of the connecting member 4 is restricted by the blocking piece 111 and the backward motion is restricted by the engagement between the front pin 44 and the first engagement hole 1a, the connecting member 4 does not move back and forth. On the other hand, because the front pin 44 is located in the first engagement hole 1a and the rear pin 45 is located above and kept outside the second engagement hole 1b, the inclined motion of the connecting member 4 in the up-down direction is not restricted. Thus, the rear end of the connecting member 4 lowers using the front slider 43 as a fulcrum. Therefore, the rear end of the movable panel 2 is lowered. At this point, the front pin 44 goes through the first engagement hole 1a and enters into the guide groove 11. The rear pin 45 goes through the second engagement hole 1b and enters into the guide groove 11. As shown in FIG. 4(c), when the connecting wall 512 slides to the position shown in the following FIG. 6(d), the declined angle of the movable panel 2 is at a maximum value. The movable panel 2 is lower than the car roof 6 at the lowered position.

As shown in FIG. 4(d), when the sliding member 5 further moves backward from the lowered position, the movable panel 2 is moved backward, and the opening part of the car roof is gradually exposed. Specifically, at the lowered position, because the fully-opened area 42f is inclined downward toward the front, the connecting wall 512 pushes the downside wall 42b of the through hole 42 backward. However, as shown in the following FIG. 6(d), the connecting wall 512 cannot press down the downside wall 42b of the through hole 42 any longer, and on the other hand, because the front pin 44 and the rear pin 45 are located in the guide groove 11 and do not engage with the first engagement hole 1a and the second engagement hole 1b, the backward motion of the connecting wall 4 is not restricted. Therefore, the connecting wall 4 moves backward along the guide groove 11. Thus, the movable panel 2 moves backward, too. The movable panel 2 which has been moved backward is drawn underneath the car roof 6. At the fully-opened position, the whole movable panel 2 is basically underneath the car roof 6. During the backward motion of the connecting wall 4, the front pin 44 and the rear pin 45 are engaged with the guide groove 11. Therefore, both the inclined motions of the connecting wall 4 and the movable panel 2 in the up-down direction are limited.

Next, contact situation between the connecting wall 512 of the sliding member 5 and the upside wall 42a and the downside wall 42b of the through hole 42 during the above process will be described.

Figure 5:
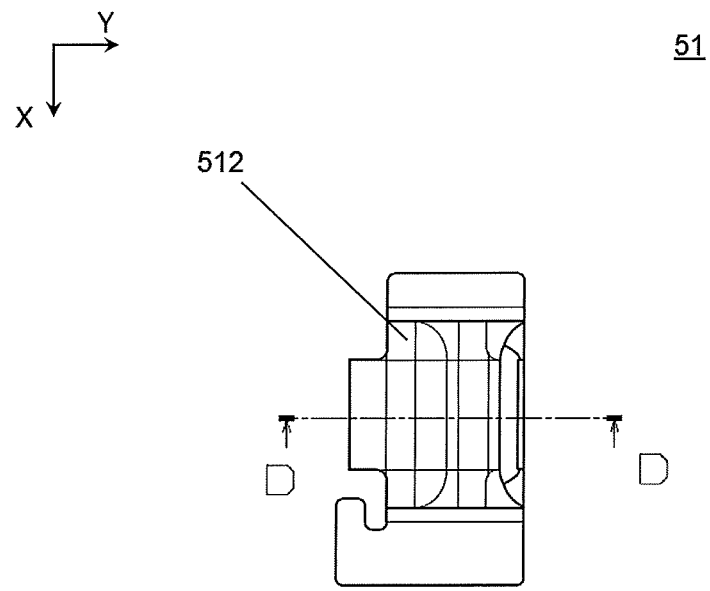
FIG. 5 is a schematic view showing the main body of the sliding member of the present invention, wherein, (a) is a top view of the main body of the sliding member, (b) is a cross-sectional view taken along the line D-D of (a).
Figure 5:
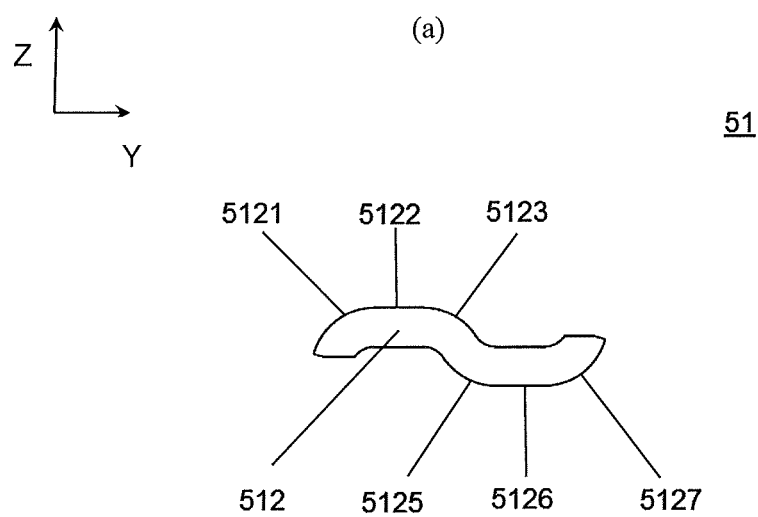

FIG. 5 is a schematic view showing the main body of the sliding member of the present invention, wherein, (a) is a top view of the main body of the sliding member, (b) is a cross-sectional view taken along the line D-D of (a).

As shown in FIG. 5, the cross section of the connecting wall 512 of the sliding member main body 51 is approximately S shape in the front-rear direction of the vehicle. The upper surface of the connecting wall 512 has, in order from front to back, a first rounded corner 5121, a first plane 5122 and a second rounded corner 5123. The lower surface of the connecting wall 512 has, in order from front to back, a third rounded corner 5125, a second plane 5126 and a forth rounded corner 5127.

Figure 6:
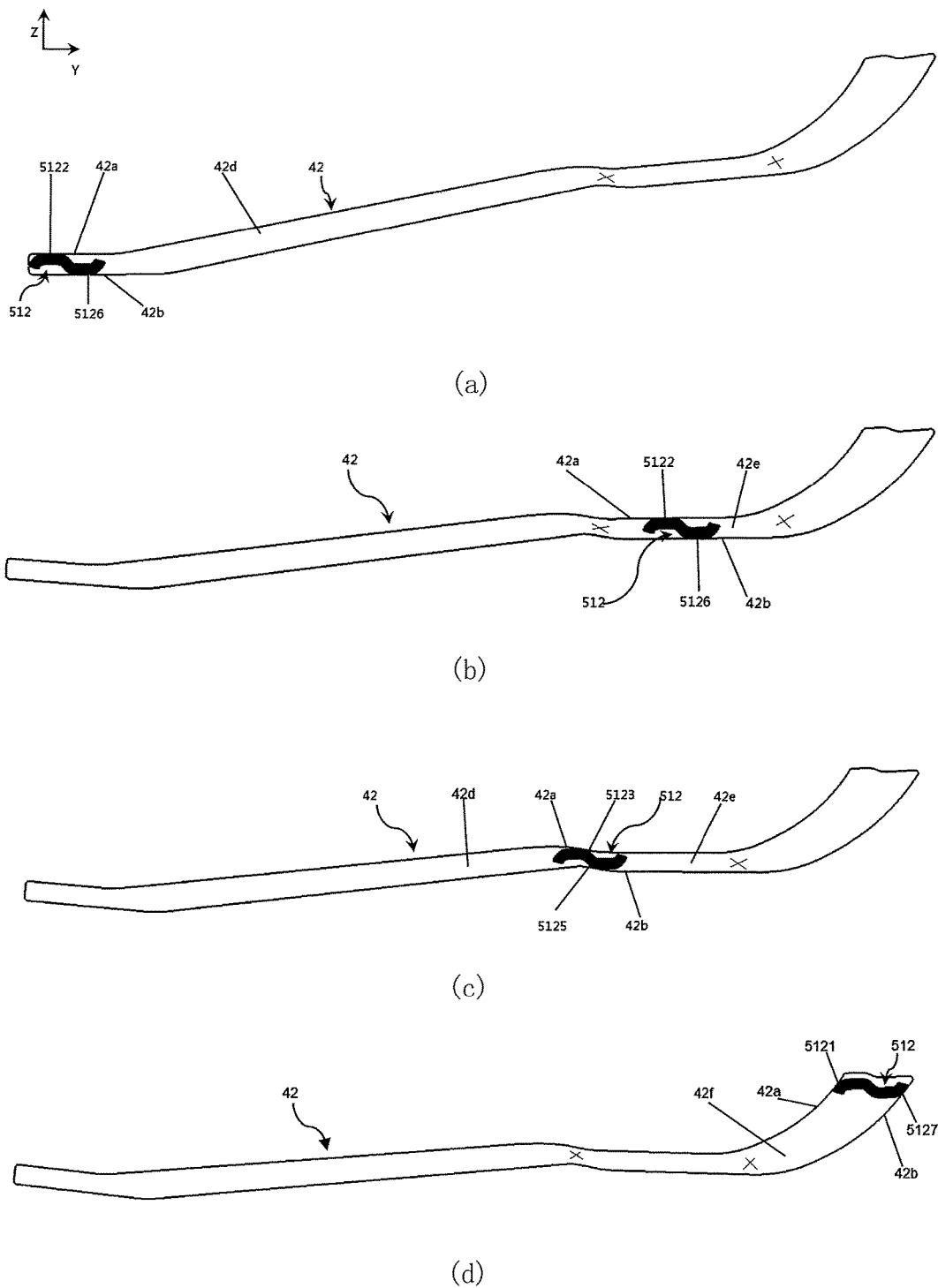
FIG. 6 is a cross-sectional view schematically showing the contact situation between connecting wall and the through hole in each state, wherein, (a) indicates an inclined state of the sunroof device, (b) indicates a fully-closed state of the sunroof device, (c) indicates a moderately-uplifted state during the process from inclined to fully-closed, and (d) indicates a lowered state and fully-opened state of the sunroof device.

FIG. 6 is a cross-sectional view schematically showing the contact situation between the connecting wall 512 and the through hole 42 in each state. FIG. 6(a) is a cross-sectional view which, corresponding to FIG. 4(b), shows that the connecting wall 512 is located in the frontmost end of the inclined area 42d of the through hole 42. In this state, the connecting wall 512 contacts with the upside wall 42a and the downside wall 42b of the through hole 42 on the first plane 5122 of the upper surface and the second plane 5126 of the lower surface, respectively. FIG. 6(b) is a cross-sectional view which, corresponding to FIG. 4(a), shows that the connecting wall 512 is located in the fully-closed area 42e of the through hole 42. In this state, the connecting wall 512 contacts with the upside wall 42a and the downside wall 42b of the through hole 42 on the first plane 5122 of the upper surface and the second plane 5126 of the lower surface, respectively. FIG. 6(c) is a cross-sectional view showing that the connecting wall 512 is located between the inclined area 42d and the fully-closed area 42e of the through hole 42. In this state, the connecting wall 512 contacts with the upside wall 42*a* and the downside wall 42*b* of the through hole 42 on the second rounded corner 5123 of the upper surface and the third rounded corner 5125 of the lower surface, respectively, in order to raise the movable panel 2 moderately. FIG. 6(*d*) is a cross-sectional view which, corresponding to FIG. 4(*c*) and FIG. 4(*d*), shows that the connecting wall 512 is located in the back-most end of the fully-opened area 42*f* of the through hole 42. In this state, the connecting wall 512 contacts with the upside wall 42*a* and the downside wall 42*b* of the through hole 42 on the first rounded corner 5121 of the upper surface and the forth rounded corner 5127 of the lower surface, respectively.

Although FIG. 6 only schematically shows the contact situation between the connecting wall 512 and the through hole 42 at three moments, the connecting wall 512 is configured as, during the whole process that the connecting wall 512 slides inside the through hole 42, contacting with the upside wall 42*a* and the downside wall 42*b* of the through hole 42 on two parts of its upper surface and the lower surface all along, respectively.

At last, the motor of the invention used for driving the movable panel and the sun shade according to FIG. 7 will be described.

The motor 7 is connected with the slider 52 (see FIG. 2) of the above sliding member 5 via the push-pull cable 72 to drive the movable panel 2 to move. The motor 8 is connected with a driving member of the sun shade (not shown) beneath the movable panel 2 via another push-pull cable 82 to drive the sun shade to move. The motors 7 and 8 are disposed at the front frame or the rear frame in the frame 1 at the same time, the axes of both motors parallel to each other and extend along the width direction of the vehicle, and FIG. 7 shows the case that the motors are disposed in the rear frame. Furthermore, the connectors 71 and 81 of the motors 7 and 8 are toward the inner side in the vehicle width direction and face to each other.

According to above structure of the invention, the following technical effects can be obtained.

Due to the sliding member main body is formed by a piece of continuous sheet, which means, upper ends of a pair of vertical walls are connected by the connecting wall, the shape is simple and the size management is easy to perform; and there would be not easy to cause abnormal noise and non-smooth slide between the connecting wall and the through hole.

Furthermore, because the sliding member is engaged with the through hole by the connecting wall, it is only necessary to coat lubricating oil on the upside and downside walls of the through hole having relatively narrow width, thereby saving usage amount of the lubricating oil.

In addition, since the upper ends of a pair of vertical wall are connected together by the connecting wall, it can ensure the strength of the connecting wall even though the width in the vehicle front-rear direction of the vertical wall is relatively narrow.

What's more, because the through hole is formed on the main body of the connecting member, instead of the upper and lower walls which protrude from both sides of the main body of the connecting member outwardly to the width direction of the vehicle to form the cam groove, it can reduce the size of the connecting member in the direction of the width of the vehicle and the difficulty of size management, so that the opening and closing mechanism is integrally miniaturized and lightweight, which reduces the cost.

Furthermore, because the connectors of the motors driving the movable panel and the sun shade are disposed facing each other inwards to the width direction of the vehicle, the size of the sunroof device in the width direction of the vehicle would not be increased and the two motors could be disposed relatively close in the front-rear direction of the vehicle. Therefore, even though the sunroof device is miniaturized in the width direction of the vehicle, the push-pull cables driven by these two motors could be prevented from interfering with each other.

In conclusion, although embodiments of the present invention have been described in detail, the scope of the present invention is not limited by above embodiments. It shall be understood that, one skilled in the art can amend the present invention without deviating from its scope. Therefore, the embodiments disclosed there are used illustratively here.

What is claimed is:

1. An opening and closing mechanism for a sunroof device of a car roof, comprising:
    a movable panel to be disposed on the sunroof device;
    a connecting member; and
    a sliding member,
    the movable panel being fastened to the connecting member,
    the connecting member having a plate-type connecting member main body which extends in the front-rear direction of the vehicle, and the thickness direction of the connecting member main body coincides with the width direction of the vehicle,
    the connecting member main body being formed with a through hole which goes through the connecting member main body in the width direction of the vehicle and extends along a curve in the front-rear direction of the vehicle,
    the sliding member having a sliding member main body, the sliding member main body including a pair of vertical walls which are opposite each other and a connecting wall which connects upper ends of said pair of vertical walls, the vertical and connecting walls are formed by a piece of continuous sheet
    wherein the connecting wall engages with and slides in the through hole to make the connecting member incline in the up-down direction of the vehicle or move in the front-rear direction of the vehicle.

2. The opening and closing mechanism for the sunroof device according to claim 1, wherein,
    the sliding member further including a slider which is separated from the sliding member main body, and the sliding member main body is supported on a guide rail of the sunroof device by the slider in a free sliding way.

3. The opening and closing mechanism for the sunroof device according to claim 2, wherein,
    the sliding member main body further including a pair of projections,
    a projection of one side of said pair of projections protrudes from the lower end of the vertical wall of one side of said pair of vertical walls in the direction opposite to the vertical wall of the other side of said pair of vertical walls,
    a projection of the other side of said pair of projections protrudes from the lower end of the vertical wall of the other side in the direction opposite to the vertical wall of the one side, and
    said pair of projections are engaged with the slider in order to fasten the sliding member main body to the slider.

4. The opening and closing mechanism used for the sunroof device according to claim 1, wherein, the cross section of the connecting wall along the front-rear direction of the vehicle shows an S shape, so that, during whole process that the connecting wall slides in the through hole, the connecting wall constantly contacts with an upside wall and downside wall of the through hole on two parts of the upper surface and lower surface of the connecting wall the whole time, respectively.

5. A sunroof device, comprising:

a movable panel which makes an opening part disposed in a roof of a vehicle open and close;

a pair of opening and closing mechanisms as claimed in claim 1, the pair of opening and closing mechanisms are disposed under the movable panel along edge part on both sides of the movable panel in the width direction of the vehicle, respectively; and a pair of guide rails which are disposed on opening edge on both sides of the opening part in the width direction of the vehicle respectively, said pair of opening and closing mechanisms are supported on said pair of guide rails in a free sliding way.

6. An opening and closing mechanism for a sunroof device of a car roof, the opening and closing mechanism comprising:

a movable panel to be disposed on the sunroof device;

a connecting member; and a sliding member, the movable panel being fastened to the connecting member, the connecting member having a plate-type connecting member main body which extends in the front-rear direction of the vehicle, and the thickness direction of the connecting member main body coincides with the width direction of the vehicle, the connecting member main body being formed with a through hole which goes through the connecting member main body in the width direction of the vehicle and extends along a curve in the front-rear direction of the vehicle, the sliding member having a sliding member main body formed by sheet metal, the sliding member main body including a pair of vertical walls which are opposite each other and a connecting wall which connects upper ends of said pair of vertical walls, wherein the connecting wall engages with and slides in the through hole to make the connecting member incline in the up-down direction of the vehicle, and wherein the cross section of the connecting wall along the front-rear direction of the vehicle shows an S shape.

7. An opening and closing mechanism for a sunroof device of a car roof, the opening and closing mechanism comprising:

a movable panel to be disposed on the sunroof device;

a connecting member; and a sliding member, the movable panel being fastened to the connecting member, the connecting member having a plate-type connecting member main body which extends in the front-rear direction of the vehicle, and the thickness direction of the connecting member main body coincides with the width direction of the vehicle, the connecting member main body being formed with a through hole which goes through the connecting member main body in the width direction of the vehicle and extends along a curve in the front-rear direction of the vehicle, the sliding member having a sliding member main body formed by sheet metal, the sliding member main body including a pair of vertical walls which are opposite each other and a connecting wall which connects upper ends of said pair of vertical walls, wherein the connecting wall engages with and slides in the through hole to make the connecting member incline in the up-down direction of the vehicle, and wherein the cross section of the connecting wall along the front-rear direction of the vehicle shows an S shape, so that, during whole process that the connecting wall slides in the through hole, the connecting wall constantly contacts with an upside wall and downside wall of the through hole on two parts of the upper surface and lower surface of the connecting wall the whole time, respectively.

* * * * *